United States Patent
Wilkinson

(10) Patent No.: US 10,820,180 B2
(45) Date of Patent: *Oct. 27, 2020

(54) APPARATUS AND METHOD OF DETERMINING A STATUS USING RFID TAG DEVICES

(71) Applicant: Walmart Apollo, LLC, Bentonville, AR (US)

(72) Inventor: Bruce W. Wilkinson, Rogers, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/573,777

(22) Filed: Sep. 17, 2019

(65) Prior Publication Data
US 2020/0015055 A1 Jan. 9, 2020

Related U.S. Application Data

(63) Continuation of application No. 16/153,462, filed on Oct. 5, 2018, now Pat. No. 10,448,231, which is a
(Continued)

(51) Int. Cl.
*H04W 4/80* (2018.01)
*H04B 5/00* (2006.01)

(52) U.S. Cl.
CPC ............ *H04W 4/80* (2018.02); *H04B 5/0031* (2013.01); *H04B 5/0062* (2013.01)

(58) Field of Classification Search
CPC combination set(s) only.
See application file for complete search history.

(56) References Cited

U.S. PATENT DOCUMENTS

| 5,376,778 A | 12/1994 | Kreft |
| 5,898,370 A | 4/1999 | Reymond |

(Continued)

FOREIGN PATENT DOCUMENTS

| CN | 101021894 | 8/2007 |
| CN | 101076644 | 11/2007 |

(Continued)

OTHER PUBLICATIONS

Armstrong, Shain; "Understanding EPC Gen 2 Search Modes and Sessions"; http://blog.atlasrfidstore.com/understanding-epc-gen-2-search-modes-and-sessions; Dec. 19, 2011; pp. 1-9.

(Continued)

*Primary Examiner* — Junpeng Chen
(74) *Attorney, Agent, or Firm* — Fitch, Even, Tabin & Flannery LLP

(57) ABSTRACT

Methods and apparatuses are provided using RFID devices to assist in determining an open status of a container. For example, a first RFID tag is fixed to a first portion of the container and a second RFID tag is fixed to a second portion of the container. Upon a user action to at least partially open the container, the first and second portions will move relative to each other, such that one or more of the RFID tags will no longer be readable by a receiver circuit proximate the container or will now be readable by the receiver circuit. The reading or cessation of reading of one or more RFID tags indicates at least one open status of the container. In some embodiments, the open status is at least one of an unsealing confirmation, an open motion initiation status, an open motion confirmation, a partial open status and a fully open status.

20 Claims, 9 Drawing Sheets

Related U.S. Application Data continuation of application No. 15/300,915, filed as application No. PCT/US2015/024024 on Apr. 2, 2015, now Pat. No. 10,117,080.

(60) Provisional application No. 61/974,381, filed on Apr. 2, 2014.

(56) References Cited

U.S. PATENT DOCUMENTS

| | | | |
|---|---|---|---|
| 5,929,760 A | 7/1999 | Monahan | |
| 6,176,425 B1* | 1/2001 | Harrison | G06K 7/0008 235/383 |
| 6,641,036 B1 | 11/2003 | Kalinowski | |
| 6,680,675 B1 | 1/2004 | Suzuki | |
| 6,888,509 B2 | 5/2005 | Atherton | |
| 6,894,660 B2 | 5/2005 | Sanogo | |
| 6,946,951 B2 | 9/2005 | Cole | |
| 6,992,567 B2 | 1/2006 | Cole | |
| 7,088,248 B2 | 8/2006 | Forster | |
| 7,170,415 B2 | 1/2007 | Forster | |
| 7,187,267 B2 | 3/2007 | Cole | |
| 7,187,288 B2 | 3/2007 | Mendolia | |
| 7,205,896 B2 | 4/2007 | Wu | |
| 7,221,259 B2 | 5/2007 | Cole | |
| 7,253,734 B2 | 8/2007 | Moskowitz | |
| 7,410,103 B2 | 8/2008 | Nagel | |
| 7,413,124 B2 | 8/2008 | Frank | |
| 7,432,817 B2 | 10/2008 | Phipps | |
| 7,528,726 B2 | 5/2009 | Lee | |
| 7,557,713 B2 | 7/2009 | Cox | |
| 7,576,655 B2 | 8/2009 | Liu | |
| 7,589,635 B2 | 9/2009 | Liu | |
| 7,592,915 B2 | 9/2009 | Liu | |
| 7,633,394 B2 | 12/2009 | Forster | |
| 7,642,916 B2 | 1/2010 | Phipps | |
| 7,642,917 B2 | 1/2010 | Tran | |
| 7,762,472 B2 | 7/2010 | Kato | |
| 7,796,041 B2 | 9/2010 | Petropoulos | |
| 7,800,497 B2 | 9/2010 | Marusak | |
| 7,812,729 B2 | 10/2010 | Copeland | |
| 7,823,269 B2 | 11/2010 | Martin | |
| 7,880,620 B2 | 2/2011 | Hatori | |
| 7,973,662 B2 | 7/2011 | Phipps | |
| 7,991,655 B1 | 8/2011 | Sacks | |
| 7,999,751 B2 | 8/2011 | Iliev | |
| 8,063,779 B2 | 11/2011 | Coveley | |
| 8,169,318 B2 | 5/2012 | Atherton | |
| 8,258,958 B2 | 9/2012 | Kang | |
| 8,286,884 B2 | 10/2012 | Wilkinson | |
| 8,286,887 B2 | 10/2012 | Wilkinson | |
| 8,410,937 B2 | 4/2013 | Collins | |
| 8,427,316 B2 | 4/2013 | Bielas | |
| 8,505,829 B2 | 8/2013 | Wilkinson | |
| 8,544,758 B2 | 10/2013 | Wilkinson | |
| 8,669,915 B2 | 3/2014 | Wilkinson | |
| 8,854,212 B2 | 10/2014 | Goidas | |
| 8,857,724 B2 | 10/2014 | Wilkinson | |
| 8,857,725 B2 | 10/2014 | Wilkinson | |
| 9,230,145 B2 | 1/2016 | Jones | |
| 9,251,488 B2 | 2/2016 | Jones | |
| 9,697,711 B2* | 7/2017 | McIntosh | G08B 13/2414 |
| 1,011,708 A1 | 10/2018 | Wilkinson | |
| 1,044,823 A1 | 10/2019 | Wilkinson | |
| 2002/0044058 A1 | 4/2002 | Heinrich | |
| 2003/0025636 A1 | 2/2003 | Chen | |
| 2004/0046643 A1 | 3/2004 | Becker | |
| 2005/0057341 A1 | 3/2005 | Roesner | |
| 2005/0110674 A1 | 5/2005 | Mendolia | |
| 2006/0065709 A1 | 3/2006 | Yamashita | |
| 2006/0145710 A1 | 7/2006 | Puleston | |
| 2006/0158311 A1 | 7/2006 | Hall | |
| 2006/0187060 A1 | 8/2006 | Colby | |
| 2006/0244608 A1 | 11/2006 | Cox | |
| 2007/0026764 A1 | 2/2007 | Green | |
| 2007/0096915 A1 | 5/2007 | Forster | |
| 2007/0164868 A1 | 7/2007 | Deavours | |
| 2007/0224939 A1 | 9/2007 | Jung | |
| 2007/0290856 A1 | 12/2007 | Martin | |
| 2008/0018431 A1 | 1/2008 | Turner | |
| 2008/0048834 A1 | 2/2008 | Lenevez | |
| 2008/0088459 A1 | 4/2008 | Martin | |
| 2008/0094181 A1 | 4/2008 | Lenevez | |
| 2008/0116256 A1 | 5/2008 | Martin | |
| 2008/0129512 A1 | 6/2008 | Bielas | |
| 2008/0129513 A1 | 6/2008 | Bielas | |
| 2008/0201388 A1 | 8/2008 | Wood | |
| 2008/0297349 A1 | 12/2008 | Leone | |
| 2009/0008460 A1 | 1/2009 | Kato | |
| 2009/0015480 A1 | 1/2009 | Shafer | |
| 2009/0027208 A1 | 1/2009 | Martin | |
| 2009/0066516 A1 | 3/2009 | Lazo | |
| 2009/0102653 A1 | 4/2009 | McGinnis | |
| 2009/0108993 A1 | 4/2009 | Forster | |
| 2009/0206995 A1 | 8/2009 | Forster | |
| 2009/0256680 A1 | 10/2009 | Kilian | |
| 2009/0265106 A1 | 10/2009 | Bearman | |
| 2010/0001079 A1 | 1/2010 | Martin | |
| 2010/0045025 A1 | 2/2010 | Cote | |
| 2010/0060425 A1 | 3/2010 | Rodriguez | |
| 2010/0079245 A1 | 4/2010 | Perng | |
| 2010/0079287 A1 | 4/2010 | Forster | |
| 2010/0116365 A1* | 5/2010 | McCarty | F16K 37/0041 137/554 |
| 2010/0141386 A1 | 6/2010 | Kim | |
| 2010/0201519 A1 | 8/2010 | Dagher | |
| 2010/0230500 A1 | 9/2010 | Wilkinson | |
| 2010/0277319 A1 | 11/2010 | Goidas | |
| 2010/0277320 A1 | 11/2010 | Gold | |
| 2011/0012713 A1 | 1/2011 | Wilkinson | |
| 2011/0063113 A1 | 3/2011 | Hook | |
| 2011/0282476 A1 | 11/2011 | Hegemier | |
| 2011/0285507 A1 | 11/2011 | Nelson | |
| 2011/0298591 A1 | 12/2011 | Mickle | |
| 2012/0013440 A1 | 1/2012 | VonBose | |
| 2012/0013441 A1 | 1/2012 | Ulrich | |
| 2012/0050011 A1 | 3/2012 | Forster | |
| 2012/0086553 A1 | 4/2012 | Wilkinson | |
| 2012/0155349 A1 | 6/2012 | Bajic | |
| 2012/0212327 A1 | 8/2012 | Torabi | |
| 2012/0217307 A1 | 8/2012 | Martin | |
| 2012/0274449 A1 | 11/2012 | Wilkinson | |
| 2013/0040570 A1 | 2/2013 | Wilkinson | |
| 2013/0043308 A1 | 2/2013 | Wilkinson | |
| 2013/0206846 A1 | 8/2013 | Wilkinson | |
| 2013/0299583 A1 | 11/2013 | Wilkinson | |
| 2014/0144986 A1 | 5/2014 | Forster | |
| 2014/0266632 A1 | 9/2014 | Jones | |
| 2014/0279294 A1 | 9/2014 | Field-Darragh | |
| 2014/0320265 A1 | 10/2014 | Jones | |
| 2014/0320271 A1 | 10/2014 | Jones | |
| 2015/0102903 A1 | 4/2015 | Wilkinson | |
| 2017/0019754 A1 | 1/2017 | Wilkinson | |
| 2019/0053025 A1 | 2/2019 | Wilkinson | |

FOREIGN PATENT DOCUMENTS

| | | |
|---|---|---|
| GB | 2481156 | 12/2011 |
| JP | 2004046904 A | 2/2004 |
| JP | 2008158569 A | 7/2008 |
| JP | 2008162120 | 7/2008 |
| JP | 2009049763 | 3/2009 |
| KR | 200412323 Y1 | 3/2006 |
| KR | 20070026388 A | 3/2007 |
| WO | 2005073937 A2 | 8/2005 |
| WO | 2009018271 A1 | 2/2009 |
| WO | 2010104991 A2 | 9/2010 |
| WO | 2015153852 | 10/2015 |

OTHER PUBLICATIONS

EPCglobal; 'EPC(TM) Radio-Frequency Identity Protocols Class-1 Generation-2 UHF RFID Protocol for Communications at 860

(56) References Cited

OTHER PUBLICATIONS

MHz-960 MHz Version 1.0.9;' Specification for RFID Air Interface by EPCglobal Inc.; 94 pages, Jan. 2005.
Impinj; UHF Gen 2 RFID Tag Antenna Designs; 2008, Impinj, Inc.; pp. 1-4.
Khan, Goh Chean.; "Near-Field UHF RFID Antenna Design"; Department of Electrical and Computer Engineering; National University of Singapore; Thesis submitted 2009; pp. 1-215.
Liu, Zhong-Min and Raymond R. Hillegass.; "A 3 Patch Near Field Antenna for Conveyor Bottom Read in RFID Sortation Application"; IEEE; Jul. 2006; pp. 1043-1046.
Nikitin et al.; An Overview of Near Field UHF RFID; Feb. 2007; 8 pages; IEEE.
PCT; App. No. PCT/US2015/024024; International Search Report and Written Opinion dated Jul. 8, 2015.
RFIDSOUP.com; RFID Soup; Mar. 6, 2009; 12 pages; published at http://rfidsoup.pbwiki.com.
Swedberg, Claire; RFID Puts Salt Lake City Drivers in the Fast Lane; RFID Journal; Oct. 1, 2010; 5 pages; published at http://www.rfidjournal.com/article/view/7907.
tagsense.com, TagSene Frequently Asked Questions; Mar. 6, 2009; 3 pages; published at www.tagsense.com/ingles/faq/faq.html.
Tagsys; AK Product Datasheet; Dec. 19, 2012; 1 page; published at www.tagsysrfid.com/products-services/rfid-tags/ak.
Tagsys; AK Product Datasheet; Feb. 14, 2010; 1 page; published at webarchive.org/web/20100214004043/http://www.tagsysrfid.com/products-services/rfid-tags/ak.
Tagsys; AK5 Converted Product Specification; Oct. 2012; 2 pages; published at www.tagsysrfid.com.
Tagsys; AKTag UHF Tag Datasheet; Nov. 23, 2012; 2 pages; published at www.tagsysrfid.com.
Tagsys; UHF AK Tag; Sep. 2008; 2 pages; published at www.tagsysrfid.com.
technovelgy.com; Passive RFID Tag (or Passive Tag); Mar. 5, 2009, 5 pages; published at www.technovelgy.com.
U.S. Appl. No. 15/300,915; Notice of Allowance dated Jun. 28, 2018; (pp. 1-7).
U.S. Appl. No. 15/300,915; Office Action dated Dec. 6, 2017; (pp. 1-19).
U.S. Appl. No. 16/153,462; Notice of Allowance dated Jun. 3, 2019; (pp. 1-7).
Wikipedia; RFID; Mar. 6, 2009; 2 pages; published at http://rfidsoup.pbwiki.com.
UKIPO; App. No. 1615898.2; Office Action dated May 27, 2020; (pp. 1-6).

\* cited by examiner

APPARATUS AND METHOD OF DETERMINING A STATUS USING RFID TAG DEVICES

RELATED APPLICATION(S)

This application is a continuation of U.S. application Ser. No. 16/153,462, filed Oct. 5, 2018, which claims the benefit of U.S. application Ser. No. 15/300,915, filed Sep. 30, 2016, now U.S. Pat. No. 10,117,080, which is a 35 U.S.C. 371 national stage application of International Application No. PCT/2015/024024 filed Apr. 2, 2015, which claims the benefit of U.S. Provisional Application No. 61/974,381, filed Apr. 2, 2014, all of which are incorporated by reference in their entirety herein.

TECHNICAL FIELD

This invention relates generally to radio-frequency identification (RFID) transceivers.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item correlated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

RFID readers are devices that attempt to read any RFID tags within range of the reader. Typically, the RFID reader transmits electromagnetic energy through free space to any tags within range. The energy is received at any RFID tag in range, modulated with identification or other data stored in the RFID tag, and backscattered by the RFID tag back the reader. The RFID reader receives the backscattered energy and demodulates the energy to recover the data. In other forms, the RFID reader induces a response within the RFID tag using electromagnetic force, the induced response is then modulated with the data of the RFID tag which then induces a corresponding response back in the RFID reader which demodulates the response to recover the data. The data recovered by the RFID reader is then processed in accordance with the purpose of the reading.

BRIEF DESCRIPTION OF THE DRAWINGS

Disclosed herein are embodiments of apparatuses and methods pertaining to the use of RFID tags and readers to automatically make certain determinations, e.g., to determine an open status of a sealed container. This description includes drawings, wherein.

Figure 1:
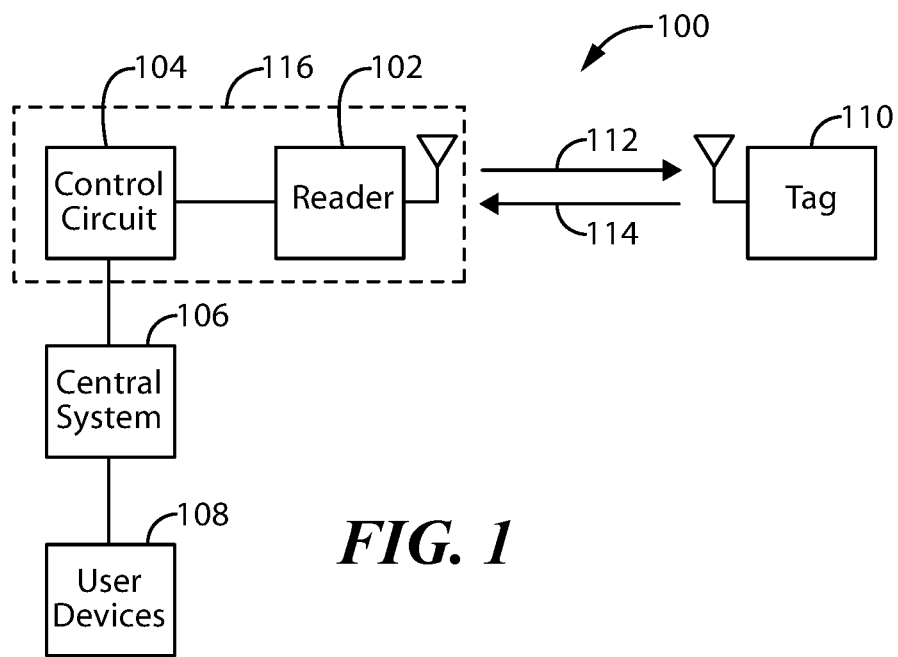
FIG. 1 is a block diagram in accordance with several embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, a container is in a closed orientation and upon a given user action, the container can be moved to an at least a partially open orientation. Accordingly, in some embodiments, it is desired to automatically determine an open status of the container. In some embodiments, an RFID-tag reader and RFID tags located at or proximate to the container are used to indicate an open status of the container. In some embodiments, a first RFID tag is fixed to a first portion of the container and a second RFID tag is fixed to a second portion of the container. Upon a user action to at least partially open the container, the first and the second portions will be caused to move relative to each other, resulting in that one or more of the RFID tags will no longer be readable by the RFID-tag reader or will now be readable by the RFID-tag reader. The reading or cessation of reading of one or more RFID tags indicates at least one open status of the container. In some embodiments, the container is closed and in some embodiments, the container is closed and sealed. In some embodiments, the open status is at least one of a fully closed/sealed status, an unsealing confirmation, an open motion initiation status, an open motion confirmation, a partial open status and a fully open status. In some embodiments, the container may take the form of a container locked within a delivered-package vault such as described in U.S. patent application Ser. No. 14/052,102 filed Oct. 11, 2013 and entitled SECURE DELIVERY RECEPTACLE, which is incorporated herein by reference, where the container contains a package for delivery to a recipient, and where it is desired to automatically detect the open status of the container to determine delivery status/completion, for example. In some embodiments, the first portion and the second portion of the container are components that are fixed to the container. In a non-limiting example, the first and second portions components including are a sleeve and an insert coupled to portions of the container.

In some embodiments, one of more of the RFID tags incorporate principles embodied in RFID tags such as those described in U.S. patent application Ser. No. 12/721,527 filed Mar. 10, 2010, now U.S. Pat. No. 8,286,884 issued Oct. 16, 2012; U.S. patent application Ser. No. 13/653,324 filed Oct. 16, 2012, now U.S. Pat. No. 8,544,758 issued Oct. 1, 2013; U.S. patent application Ser. No. 13/828,821 filed Mar. 14, 2013; U.S. patent application Ser. No. 12/884,097 filed Sep. 16, 2010, now U.S. Pat. No. 8,286,887 issued Oct. 16, 2012; and U.S. patent application Ser. No. 13/653,331 filed Oct. 16, 2012, now U.S. Pat. No. 8,505,829 issued Aug. 13, 2013, all of which are incorporated herein by reference. Such RFID tags are designed such that the near field portion and the far field portion of the RFID tag may be coupled together and decoupled. When coupled, the RFID tag is readable by an RFID tag reader in both the near field of RFID communication and in the far field of RFID communication. When decoupled, the RFID tag is only readable by an RFID tag reader in the near field of RFID communication. In some cases, the near field portion of the RFID tag may be a pre-manufactured generic component which is cooperated with a far field antenna separately designed and manufactured for the application.

In some embodiments, a multi-tag RFID device is provided that includes first and second near field RFID tags implemented on a substrate and that are each coupled to and share a conductive element on the substrate. The conductive element functions as a far field antenna to both the first and second near field only RFID tags. In some embodiments, the RFID device is implemented in a single inlay. Such RFID devices may be used in some embodiments to indicate an open status of a container and/or may be used for other purposes.

Figure 12:
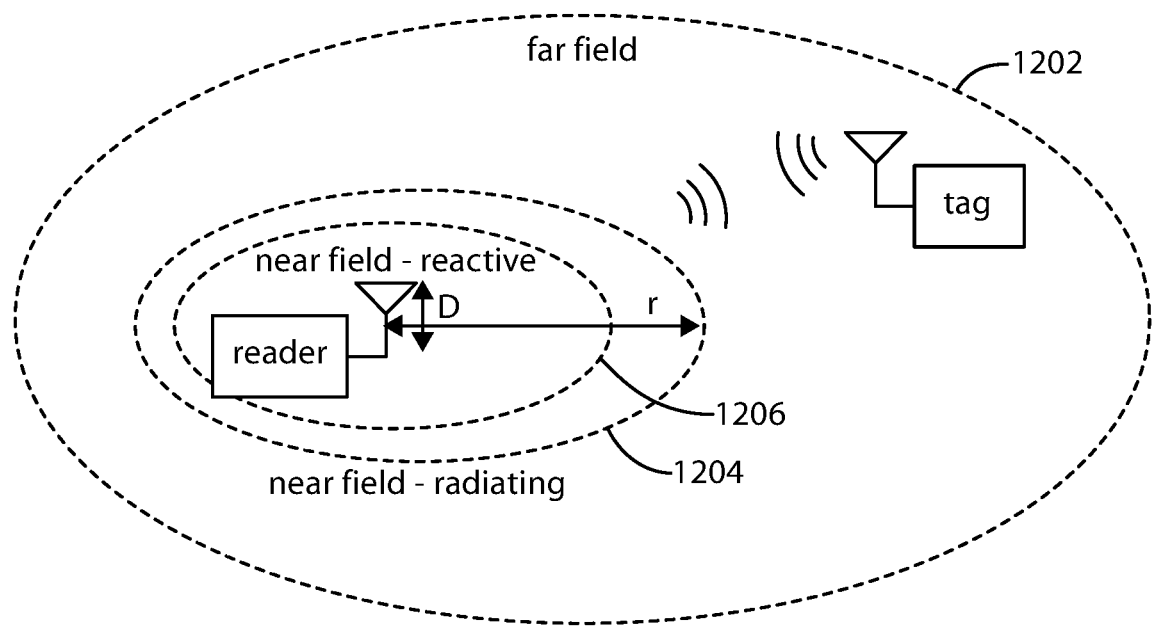
FIG. 12 is an illustration of a near field and a far field of RFID communication in accordance with some embodiments.

As is well known in the art, referring initially to FIG. 12, embodiments of the near field and the far field of RFID communication are explained and illustrated. For example, the near field is the region about the reader antenna where the reader antenna and the tag are coupled within one full wavelength of the carrier wave; however, in many practical applications, the near field is within one half wavelength of the carrier wave. The far field 1202 is the region beyond the near field region, i.e., coupled beyond one full wavelength of the carrier wave. In the far field, electric and magnetic fields propagate outward as an electromagnetic wave and are perpendicular to each other and the direction of propagation. The angular field distribution does not depend on the distance from the antenna. These electric and magnetic fields are related to each other via free-space impedance. Thus, in the far field region, the electromagnetic signal propagates as waveform.

In the near field region, the electromagnetic signal does not propagate as a waveform. The near field region has two sub-regions: a near field radiating sub-region 1204 and a near field reactive sub-region 1206. In the near field reactive sub-region 1206, energy is stored, but not radiated. The near field reactive sub-region 1206 is typically where the reader antenna and the tag are coupled within ½ wavelength of the carrier wave. This is typically very close to the reader antenna. The near field radiating sub-region 1204 is a transitional region between the near field reactive sub-region 1206 and the far field region 1202. The near field radiating sub-region 1204 is typically where the reader antenna and the tag are coupled between ½ to 1 full wavelength of the carrier wave. In the near field radiating sub-region 1204, while there is radiated electric and magnetic fields, these electric and magnetic fields do not propagate and are not perpendicular to each other and to the direction of propagation (if there were propagation). This is well understood in the art.

In many embodiments, the boundary between the near field region and the far field region can be defined as "r", illustrated in FIG. 12. In some embodiments, this boundary is a function of the antenna characteristics (e.g., the antenna's electrical size) and the wavelengths used, as well as whether the reader is a point source or array. In some embodiments, with antennas whose size is comparable to wavelength (such as commonly used in UHF RFID applications), the approximate boundary (r) between the far field and the near field regions may be expressed as $r=2D^2/\lambda$ where D is the maximum antenna dimension and $\lambda$ is the wavelength. For electrically small antennas (e.g., as used in LF/HF RFID applications), the near field radiating sub-region is small and the boundary r between near and far fields may be expressed as $r=\lambda/2\pi$. These relationships are well known in the art.

Generally, the near field and far fields of RFID communication are well known in the art. Many near field devices include devices complying with the Near Field Communication (NFC) Forum standards, High Frequency (HF) devices, Electronic Shelf Labels (ESLs), and so on. Other examples of devices that communicate in the near field are near field only tags such as those tags described in U.S. Pat. Nos. 8,286,884 and 8,286,887, both of which are incorporated herein by reference, i.e., tags that lack a far field antenna and magnetically, inductively or capacitively couple to a corresponding reader. Devices that communicate in the near field typically have a range of being detected at about an inch or so away up to about 1-2 feet maximum depending on the frequencies used.

In a typical ultra-high frequency (UHF) RFID system where the carrier frequency is in the range of 860-960 MHz, the effective near field is the region up to approximately 1-15 centimeters from the reader antenna, whereas the far field is the region from approximately 15-40 centimeters and beyond the reader antenna. In many cases, the reader can read tags in the near field up to about 15 centimeters away, whereas depending on the tag antenna, the reader can read tags in the far field up to about 20-30 feet or more away. These features are also well known in the art.

It is understood that the near field tags may be designed to operate with reader antennas operating at a variety of frequencies, such as low frequency (LF) at 125-134 kHz, high frequency (HF) at 13.56 MHz, ultra high frequency (UHF) at 860-960 MHz, microwave frequencies at 2.4 and 5.8 GHz, for example.

Another way to view near field and far field communications relates to how the reader and the tag are coupled together. The reader and a near field tag communicate through magnetic, inductive or capacitive coupling between the reader antenna and the tag antenna (typically a near field loop antenna). For example, a current is induced in the reader antenna (e.g., loop antenna), which when brought into close range with the tag antenna (loop antenna) induces a current in the tag antenna which is modulated according to the data of the tag and induced back to the reader antenna. This type of near field communication is well known in the art and may be considered the near field reactive sub-region 1206 of FIG. 12. Devices capable of communicating in the near field radiating sub-region need more than a loop antenna. For example, at least some additional conducting portion extending from the loop antenna (such as the conductors 424 and 426 of FIG. 4C discussed below). Such conductors will provide some radiation of the electric and magnetic fields but not provide a propagation of a waveform. This type of near field communication is well known in the art and may be considered the near field radiating sub-region 1204 of FIG. 12.

With far field RFID devices, the reader and the tag communicate through the transmission of electromagnetic energy from the reader to the tag which is reflected back as transmitted electromagnetic energy to the reader. Far field communicating devices typically use dipole antennas or other antenna structures capable of transmitting energy and received transmitted energy in the far field. In many cases, the far field radiation decays as described in the far field region 1202 of FIG. 12. This type of far field communication is well known in the art. Further information regarding the near field and far fields of RFID operation are described in NIKITIN ET AL., "An Overview of Near Field UHF RFID", IEEE, February 2007, which is incorporated herein by reference.

It is noted that in some embodiments, the read range of a given reader may be limited or changed by reducing or adjusting the power level of signals transmitted by the RFID reader. For example, far field RFID readers at normal operating power levels may be able to read far field RFID tags up to 20-30 feet. For example, the transmit power of the reader could be adjusted such that the reader can only read RFID tags at less than the normal range, e.g., up to 10-20 feet. This allows for the reading of the tag to occur only when the tag and tag reader are brought into a closer proximity compared to when the reader reads at normal power levels. Conversely, the increase of the read range results in the detection of a less precise (farther) location relationship between the reader and the tag than when the RFID reader operates at normal power.

Referring now to FIG. 1, a system 100 is shown including an RFID reader 102 (which may also be referred to as an RFID-tag reader or simply as a reader) which is coupled to a control circuit 104 which is coupled to a central system 106 and which is in turn coupled to one or more user devices 108. As is well known in the art, the RFID reader 102 is configured to "read" any RFID tags (which may also be referred to as RFID transceivers), such as RFID tag 110 within the operating range of both the RFID reader 102 and the RFID tag 110. For example, as illustrated in FIG. 1, in a passive RFID communication system, the RFID reader 102 includes a reader antenna and transmits a modulated radio frequency (RF) signal 112 to the RFID tag 110 (and any other RFID tag within range). The tag antenna receives the RF signal and forms an electric and magnetic field from which the RFID tag 110 draws power for the integrated circuit of the RFID tag 110. The integrated circuit then causes the RFID tag 110 to modulate a backscatter RF signal 114 back to the RFID tag reader 102, the RF signal 114 containing information encoded in the memory of the RFID tag 110, such as the ID of the RFID tag 110. The functionality and operation of the reading of tags by the RFID reader 102 and the RFID tag 110 is well known in the art.

In several embodiments, the RFID tag 110 is located on or proximate to a container which is normally in a closed orientation and is designed to be moved into an open orientation by a user. The RFID reader 102 is used to read the RFID tag 110. Information or signaling indicating whether the RFID tag 110 is read or not by the RFID reader 102 is passed to the control circuit 104 and in some embodiments, used to determine an open status of the container. In some embodiments, the RFID tag reader 102 is located in the far field of RFID communication relative to the location of the RFID tag 110. As such, in embodiments where the RFID tag 110 comprises decoupleable near field and far field components, the RFID tag 110 is readable by the RFID reader when the near field and far field components are coupled together. The RFID tag 110 is no longer readable by the RFID reader when the near field and far field components are decoupled, since the RFID tag would only be readable in the near field and the RFID reader is in the far field of RFID communication relative to the RFID tag.

In some embodiments, the control circuit 104 is integrated with or part of the device or apparatus including the RFID reader 102 (as indicated by the dashed box 116). In some embodiments, the control circuit 104 and the RFID reader 102 are integrated on the same integrated circuit device, e.g., on the same circuit board. In such cases, it is noted that when the RFID reader 102 and control circuit 104 are integrated, a function indicated herein as being performed by the control circuit may also be performed by the RFID reader 102. In other embodiments, the control circuit 104 is separate from and coupled to the RFID reader 102. For example, the control circuit 104 may be located at, integrated into or coupled to the central system 106. In such cases, the control circuit 104 is coupled by one or more wired and/or wireless communication links using the appropriate communicating devices. In some embodiments, the central system 106 may be at a physical location or local to the location of the control circuit 104 and/or reader 102, or may be at a remote location, for example, the central system 106 is a remote system (in the cloud) and coupled to the control circuit 104 via a network. Further, in some embodiments, the central system 106 may be used to store and monitor the open status of containers that are initially in a closed orientation, but are intended to be opened by a user, where such detection and determinations of open status are made by the control circuit 104. Such information and/or open statuses may be communicated for stored, display, communication, etc. to various user devices 108.

Figure 2:
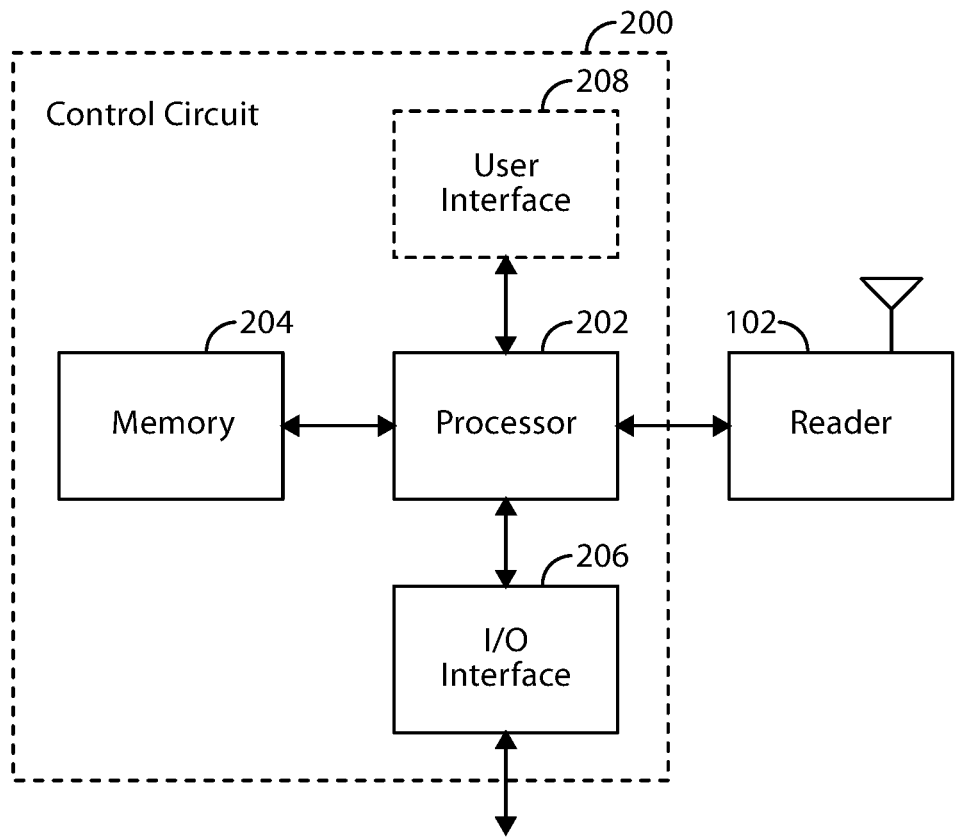
FIG. 2 is a block diagram in accordance with several embodiments.

FIG. 2 illustrates one embodiment of a control circuit such as generally shown in FIG. 1. The control circuit 200 includes a processor 202, a memory 204, an input/output (I/O) interface 206 and an optional user interface 208. Generally, the memory 204 stores the operational code or set of instructions that is executed by the processor 202 to implement the functionality of the circuit. The memory 204 also stores any particular data that may be needed to detect the open status and make the determinations discussed herein. Such data may be pre-stored in the memory or be received, for example, from the central system 106 during use. It is understood that the processor 202 may be implemented as one or more processor devices as are well known in the art. Similarly, the memory 204 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 204 is shown as internal to the system 200; however, the memory 204 can be internal, external or a combination of internal and external memory. Additionally, the control circuit may include a power supply (not shown) or it may receive power from an external source.

The processor 202 and the memory 204 may be integrated together, such as in a microcontroller, application specification integrated circuit, field programmable gate array or other such device, or may be separate devices coupled together. The I/O interface 206 allows communicational coupling of the control circuit to external components, such as the central system 106 and/or user devices 108. Accordingly, the I/O interface 206 may include any known wired and/or wireless interfacing device, circuit and/or connecting device. In some embodiments, a user interface 208 is included in the control circuit 200 which may be used for user input and/or output display. For example, the user interface 208 may include any known input devices, such a buttons, knobs, selectors, switches, keys, touch input surfaces and/or displays, etc. Additionally, the user interface 208 may include one or more output display devices, such as lights, visual indicators, display screens, etc. to convey information to a user, such as a given open status of a given container. The control circuit 200 is configured to communicate with the reader 102 to control its operation and to receive information from the RFID reader 102 regarding the reading of certain RFID tags. While FIG. 2 illustrates the RFID reader 102 being coupled to the processor 202, it is understood that the reader 102 may actually be coupled to a communication bus of the control circuit 200 to which the processor 202 and/or memory 204 may also be coupled. In some embodiments, the control circuit 200 and the RFID reader 102 are integrated on the same integrated circuit device, e.g., on the same circuit board.

Generally, the control circuits 104 and 200 can comprise a fixed-purpose hard-wired platform or can comprise a partially or wholly programmable platform. These architectural options are well known and understood in the art and require no further description here. These control circuits 104 and 200 are configured (for example, by using corresponding programming as will be well understood by those skilled in the art) to carry out one or more of the steps, actions, and/or functions described herein.

Referring next to FIGS. 3A-3D, diagrams are shown illustrating an application in accordance with several embodiments in order to automatically detect an open status of a container normally in a closed orientation and for which will be moved to at least a partially open orientation by user action. A first portion 302 of the container and a second portion 304 of the container are removably coupled to each other. In the illustrated embodiment, the first portion 302 comprises an insert that at least partially fits within a space formed by the second portion 304, which is embodied as a sleeve. In some embodiments, one or both of the first portion 302 and the second portion 304 are integral to or part of the container. In some embodiments, one or both of the first portion 302 and the second portion 304 are components that are fixed to container.

Figure 3A:
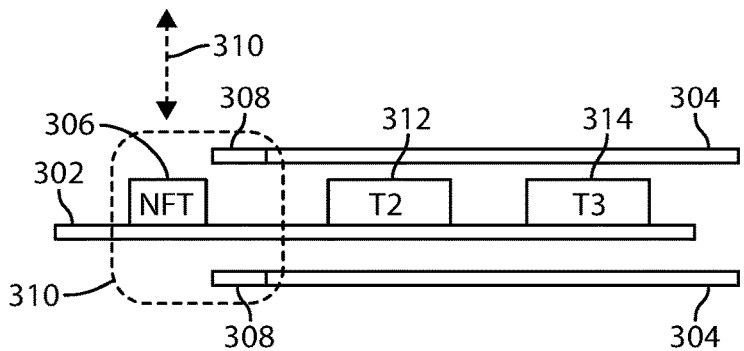
FIGS. 3A-3D are diagrams illustrating an application in accordance with several embodiments.

In some embodiments, the first portion 302 includes one or more RFID tag devices. In the illustrated embodiments, a first RFID tag 306 is coupled (e.g., applied, formed, integrated, adhered, etc.) to a surface of the first portion 306, where the first RFID tag 306 is configured by itself to communicate only in a near field of RFID communication. For example, the first RFID tag 306 includes a chip and a near field antenna (e.g., loop antenna). In some embodiments, the first RFID tag may be referred to as a near field only RFID tag. A conductive element 308 is implemented (e.g., formed, printed, patterned, etched, adhered, etc.) at the second portion 304. The conductive element 308 is located in proximity to the first RFID tag 306 when the container is in the closed orientation. The conductive element 308 is configured to function as a far field antenna for the first RFID tag 306 such that the first RFID tag 306 is readable by an RFID reader in a far field of RFID communication when the container is in the closed orientation (illustrated in FIG. 3A). It is noted that the first RFID tag 306 is also readable in the near field of RFID communication. FIG. 3A illustrates the readability of the first RFID tag in the far field as dashed arrow 310. Further details and implementations of near field only RFID tag devices coupled together with conductive elements forming far field antennas as described in the patents and patent applications incorporated herein by reference above.

As illustrated, the first RFID tag 306 extends from the space formed by the second portion, e.g., it is not covered by the second portion 304. In some embodiments, the conductive element 308 is formed at or near a periphery edge of the second portion 304 such that the conductive element 308 inductively, electrically or capacitively couples to the near field antenna (e.g., loop antenna) of the first RFID tag 306. In some embodiments, if the conductive element 308 were to cover the first RFID tag 306, it would electromagnetically shield the first RFID tag such that the first RFID tag 306 would not be readable in the far field of RFID communication.

A second RFID tag 312 is fixed to the first portion 302 such that the second RFID tag 312 is shielded by the second portion 304 and is not readable by the RFID reader when the container is in the closed orientation. For example, in some embodiments, the second portion 304 is made of a conductive material that substantially surrounds the second RFID tag 312 and functions as a Faraday cage making it unreadable in the far field of RFID communication. In some embodiments, an optional third RFID tag 314 is fixed to the first portion 302 such that the third RFID tag 314 is also shielded by the second portion 304 and is not readable by the RFID reader when the container is in the closed orientation. For example, in some embodiments, the second portion 304 substantially surrounds the third RFID tag 314 functioning as a Faraday cage and making it unreadable in the far field of RFID communication.

Thus, in some embodiments, as illustrated in FIG. 3A, when the container is in the closed orientation, the first RFID tag 306 is readable by the RFID reader in the far field of RFID communication, whereas the second RFID tag 312 and the third RFID tag 314 are not readable in the far field.

Figure 3B:
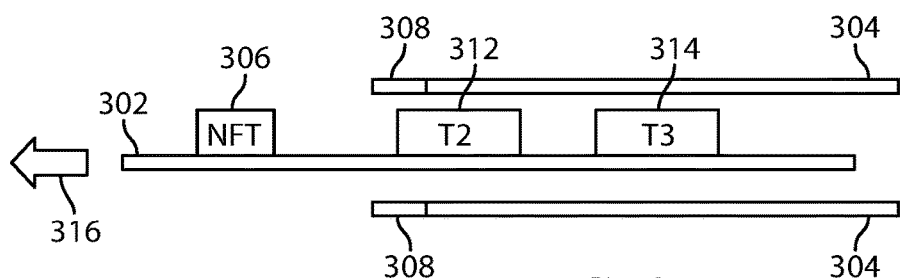

FIG. 3B illustrates the relative positioning of the first portion 302 and the second portion 304 upon a user action to open the container at least a first amount. The relative motion is illustrated for example as the first portion 302 moving in the direction of arrow 316. Such movement decouples the first RFID tag 306 (e.g., near field only device) from the conductive element 308 (e.g. far field antenna) such that the first RFID tag 306 is no longer readable in the far field. In some embodiments, the cessation of readability of the first RFID tag 306 indicates a first open status of the container. Depending on the embodiment, the first open status may correspond to one or both of an unsealed status and an open motion initiation status of the container. In FIG. 3B, the second RFID tag 312 and the third RFID tag 314 are still shielded by the second portion 304 and; thus, as not readable by the RFID reader in the far field.

Figure 3C:
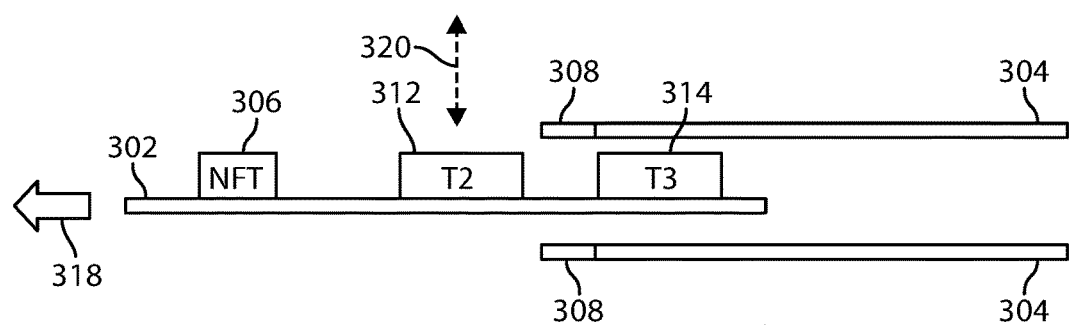

FIG. 3C illustrates the relative positioning of the first portion 302 and the second portion 304 upon a user action to further open the container at least a second amount. The relative motion is illustrated for example as the first portion 302 moving in the direction of arrow 318. Such movement further results in the exposure or unshielding of the second RFID tag 312 which is now readable by an RFID reader in the far field, as indicated by dashed arrow 320. In this orientation, the first RFID tag 306 and the third RFID tag 314 are not readable in the far field, but the second RFID tag 312 is. In some embodiments, the reading of the second RFID tag 312 indicates a second open status of the container. Depending on the embodiment, the second open status may correspond to or comprise at least one of an unsealing confirmation, an open motion initiation status, an open motion confirmation, a partial open status and a fully open status of the container.

Figure 3D:
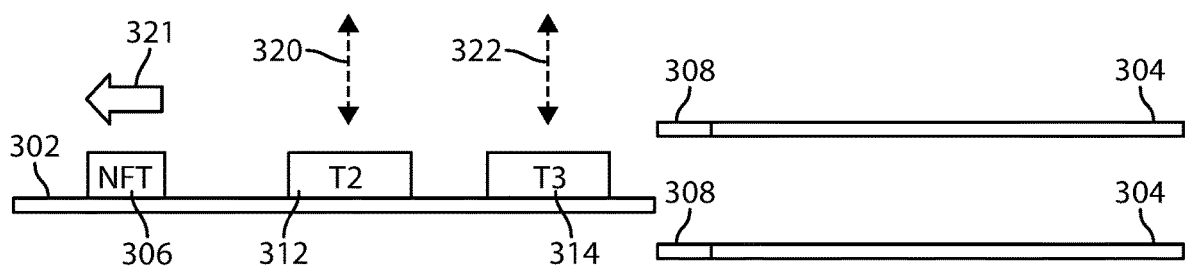

FIG. 3D illustrates the relative positioning of the first portion 302 and the second portion 304 upon a user action to further open the container at least a third amount. The relative motion is illustrated for example as the first portion 302 moving in the direction of arrow 321. Such movement further results in the exposure or unshielding of the third RFID tag 314 which is now readable by an RFID reader in the far field, as indicated by dashed arrow 322. In this orientation, the first RFID tag 306 is not readable in the far field, but the second RFID tag 312 and the third RFID tag 314 are. In some embodiments, the reading of the third RFID tag 314 indicates a third open status of the container. Depending on the embodiment, the third open status may correspond to or comprise at least one of a partial open status and a fully open status of the container.

FIGS. 3A-3D illustrate various opening motions triggered by the user. In some embodiments, each motion is a separate incremental motion. In some embodiments, each motion is a portion or positional snapshot of one continuous motion.

In some embodiments, the reading and cessation of reading of one or more RFID tags provides indications of an open status of the container. For example, in one embodiment, when the first RFID tag 306 is read in the far field by the RFID reader (e.g., see FIG. 3A), the open status of the container corresponds to fully closed and optionally fully sealed depending on the closure mechanism of the container. When the first portion and the second portion are moved relative to each other at least a first amount (e.g., see FIG. 3B), the first RFID tag 306 is no longer readable in the far field. In some embodiments, this indicates an unsealed status or an open motion initiation status. When the first portion and the second portion are moved relative to each other at least a second amount (e.g., see FIG. 3C), the second RFID tag 312 is now readable in the far field indicating that the open status is one or more of an unsealing confirmation, an open motion initiation status, an open motion confirmation, a partial open status and a fully open status. In some embodiments, an unsealing confirmation status is an indication that confirms that the container has been unsealed, an open motion initiation status is an indication that the opening motion has begun, and an open motion confirmation status is an indication that the opening motion has been initiated or confirmed. In some embodiments, a partial open status and a fully open status are indications that the container is partially open and fully open, respectively. Whether the indication is partial or fully open is a function of the range of motion of the first portion 302 and the second portion 304, the range of motion needed for the container to be partially or fully open, and/or the location of the second RFID tag on the first portion.

In embodiments with the third RFID tag 314, when the first portion and the second portion are moved relative to each other at least a third amount (e.g., see FIG. 3D), the third RFID tag 314 is now readable in the far field indicating that the open status is a fully open status. For example, in such embodiments, typically the reading of the second RFID tag 312 would indicate one or more of an unsealing confirmation, an open motion confirmation, and a partial open status, and the reading of the third RFID tag 314 would indicate an open status being fully open.

It is understood that while FIGS. 3A-3D illustrate the first portion moving relative to a stationary second portion, the relative movement may occur in any way that results in this relative movement. For example, the second portion could be moved relative to a fixed first portion. In another example, both of the first portion and the second portion could be moved relative to each other in the user's opening motion.

In order to distinguish between tag reads, each tag can be encoded with a unique identifier known to the control circuit and that is provided by the reader when being read. In some embodiments, the tags may be encoded with an Electronic Product Code (EPC) such as a Serialised Global Trade Item Number (SGTIN) of the EPCGlobal Tag Data Standard as is well known in the art. In some embodiments, the unique identifiers are identical to each except for at least one bit, e.g., the last 1-2 bits of a SGTIN EPC code could be different. By using embodiments that allow automatic detection of the open status of a container, it can be determined automatically and without visual inspection if a given container has been opened, or has been unsealed but not fully opened.

While the first RFID tag 306 is illustrated as a decoupled design RFID tag such as described in the patent and applications incorporated herein by reference, the second and third RFID tags could be any RFID tag design known in the art that is readable in the far field of RFID communication. Further, in some embodiments, the second and third tags could be implemented as a multi-tag RFID device that includes first and second near field RFID tags implemented on a substrate and that are each coupled to and share a conductive element on the substrate that functions as a far field antenna to both the first and second near field only RFID tags, such as described with reference to FIGS. 6 and 7.

Figure 4A:
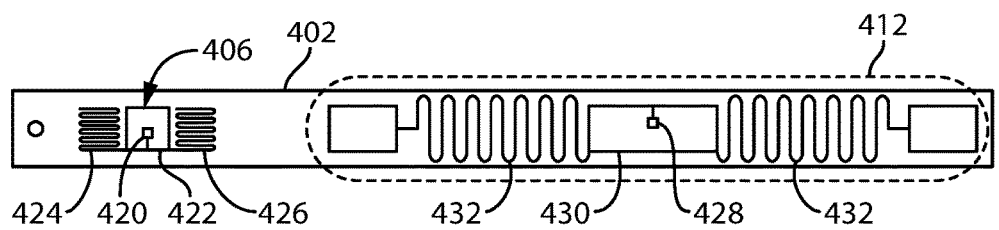
FIGS. 4A-4B are diagrams illustrating an application in accordance with several embodiments.
Figure 4B:
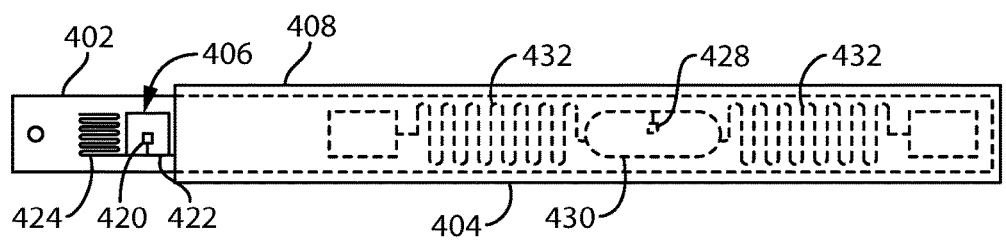
Figure 4C:
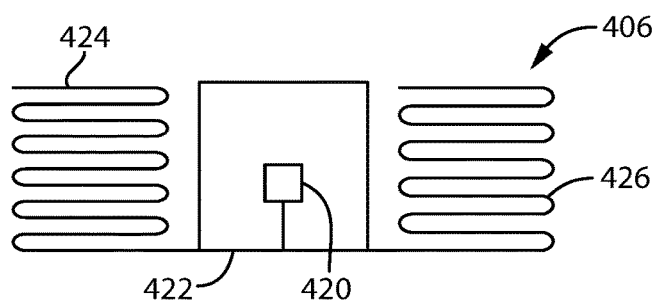
FIG. 4C is an illustration of a near field RFID device in accordance with several embodiments.

Referring to the plan views of FIGS. 4A and 4B, an exemplary first component 402 and second component 404 (i.e., more specific examples of the first portion 302 and the second portion 304 of FIGS. 3A-3D) of a container is shown. In FIG. 4A, the first component 402 includes a first RFID tag 406 and a second RFID tag 412 fixed thereto. In this embodiment, the first component 402 is embodied as an insert that fits within a space formed by the second component 404 (seen in FIG. 4B).

The first RFID tag 406 is configured to operate only in the near field of RFID communications. Accordingly, the first RFID tag 406 includes an integrated circuit or chip and near field antenna (e.g., loop antenna). For example, as is illustrated in more detail in FIG. 4C, the first RFID tag 406 includes an integrated circuit or chip 420 coupled to a near field antenna 422 (e.g., loop antenna) and including elongated conductors 424 and 426 that allow the loop antenna 422 to be coupled to a far field antenna. In some embodiments, the near field RFID tag 406 may be implemented as the Impinj® Bolt™ (commercially available from Impinj, Inc. of Seattle, Wash.) which is a near field only tag that has a chip with a loop antenna and patterned elongated conductors to allow for capacitive coupling of the loop to a far field antenna. It is noted that the loop antenna 422 allows for communication in the near field reactive sub-region 1206, and the conductors 424 and 426 allow for communication in the near field radiating sub-region 1204. In some embodiments, the near field RFID tag 406 may be implemented as the Impinj® Button™ (commercially available from Impinj, Inc. of Seattle, Wash.) which is a near field only tag that has a chip with a circular loop antenna (and no patterned elongated conductors), which on its own only allows for communication in the near field reactive sub-region 1206.

The second component 404 includes a portion thereof that implements a conductive element 408 that functions as a far field antenna. When the first component 402 is received within the second component 404 (see FIG. 4B), the conductive element 408 is coupled (e.g., electrically, inductively or capacitively) to the near field antenna 422 of the first RFID tag 406 (e.g., the conductive element 408 capacitively couples to the conductor 426 and loop antenna 422) such that the first RFID tag 406 is readable in the far field of RFID communications. When the first component 402 is moved relative to the second component 404 (e.g., pulled out to the left in the illustration), the first RFID tag 406 is decoupled from the conductive element 408 such that the first RFID tag 406 is no longer readable in the far field.

The second RFID tag 412 can be any RFID tag device that is capable of being read in far field. For example, as shown in FIGS. 4A and 4B, the second RFID tag 412 takes the form of a standard inlay having an integrated circuit or chip 428 and near field antenna 430 (e.g., loop antenna) electrically coupled to and integrated with a far field antenna structure 432. In the illustrated embodiment, the far field antenna structure 432 is a dipole antenna structure and is part of the same inlay device. When the first component 402 is received within the second component 404 (see FIG. 4B), the second RFID tag 412 is shielded by the second component 404 such that it cannot be read by the RFID reader. When the first component 402 is moved relative to the second component 404 to expose the second RFID tag 412, the second RFID tag 412 is no longer shielded and may be read by the RFID reader in the far field.

Relative to the generic embodiments of FIGS. 3A-3D, the first RFID tag 406 is an embodiment of the first RFID tag 306, and the second RFID tag 412 is an embodiment of the second RFID tag 312. In the embodiment of FIGS. 4A-4B, there is no embodiment of a third RFID tag, but it is understood that a third RFID tag could be added.

Figure 5:
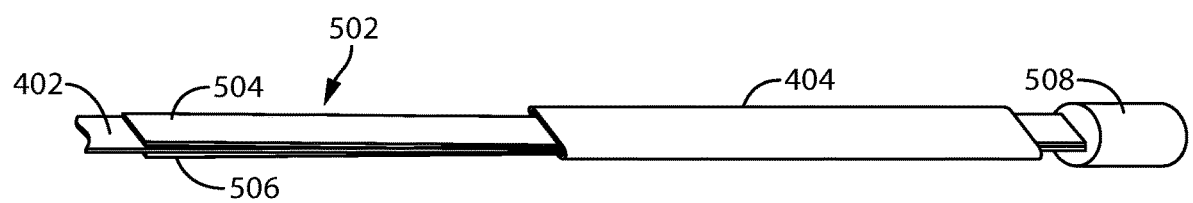
FIG. 5 is a diagram illustrating application in accordance with several embodiments.

In some embodiments, the first component is an insert configured to fit within the second component which may be embodied as a sleeve. In some embodiments, the insert is at least partially flexible such that it can be removed from the sleeve but not easily re-inserted back into the sleeve. In some embodiments, a tool is provided to insert the first component within the sleeve. For example, an insert tool 502 is shown in FIG. 5. In some embodiments, the tool 502 comprises a handle 508 and two elongated pieces 504 and 506 (e.g., blades or plates) that sandwich the first component 402. The tool 502 is generally more rigid that the first component 402. In some embodiments, the tool is inserted through the second component 404 from a through side, while the first component 402 is sandwiched between the pieces 504 and 506 extending from the second component. Then the tool 502 is pulled by the handle 508 to guide the first component 402 into the second component 404. Once the first component 402 is fully inserted, the tool 502 is pulled free of the second component 404.

Figure 6:
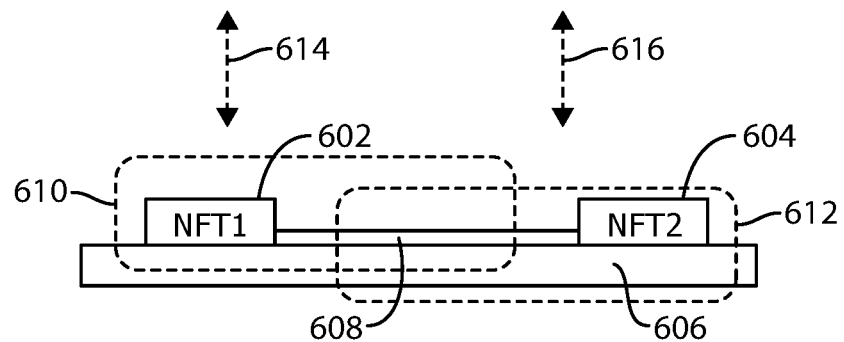
FIG. 6 is a diagram of a multi-tag RFID device in accordance with several embodiments.

Referring next to FIG. 6, a side elevation view is shown of a multi-tag RFID device 600 including a first near field RFID tag device 602 and a second near field RFID tag device 604 implemented on a substrate 606 and that are each coupled to and share a conductive element 608 on the substrate that functions as a far field antenna to both the first and second near field RFID tag devices 602 and 604. In the illustrated embodiments, the first near field RFID tag device 602 is fixed at a first portion (e.g., first end) of the substrate and the second near field RFID tag device 604 is fixed at a second portion (e.g., second end) of the substrate. In some embodiments, the first and second near field RFID tag devices are fixed to the substrate being spaced apart from each other.

Generally, each of the near field RFID tag devices includes an integrated circuit device or chip and a near field antenna (e.g., a loop antenna), and optionally any coupling structure that may be needed or desired to couple the near field antenna to the conductive element. The conductive element 608 may be any far field antenna structure or pattern as is known in the arts. The conductive element 608 can be configured to couple to the antenna of each of the near field RFID tag devices through one of electrical, inductive and capacitive coupling. Such various coupling approaches are further described in the patents and patent applications incorporated herein by reference. In some embodiments, the near field RFID tag devices and the conductive element are manufactured together and implemented on a single inlay device.

Functionally, the first near field RFID tag device 602 couples with the conductive element 608 to form a first combination near field and far field RFID tag 610 that can be read in the near field as well as in the far field. Arrow 614 indicates the readability of the RFID tag 610 in the far field of RFID communication. The second near field RFID tag device 604 couples with the conductive element 608 to form a second combination near field and far field RFID tag 612 that can be read in the near field as well as in the far field. Arrow 616 indicates the readability of the RFID tag 512 in the far field of RFID communication.

It is understood that while two near field RFID tag devices are illustrated, three or more near field RFID tag devices could be implemented on the substrate and spaced apart from the other near field RFID tag devices and also share the conductive element.

In some embodiments, the multi-tag RFID device may be useful in applications where one or more of the near field RFID tag devices can be selectively shielded, e.g., by a conductive barrier positioned about the one or more near field RFID tag devices. Such can result in the selective readability of one or more of the near field RFID tag devices to an RFID reader, which can be used to make automated determinations and/or detections.

Figure 7:
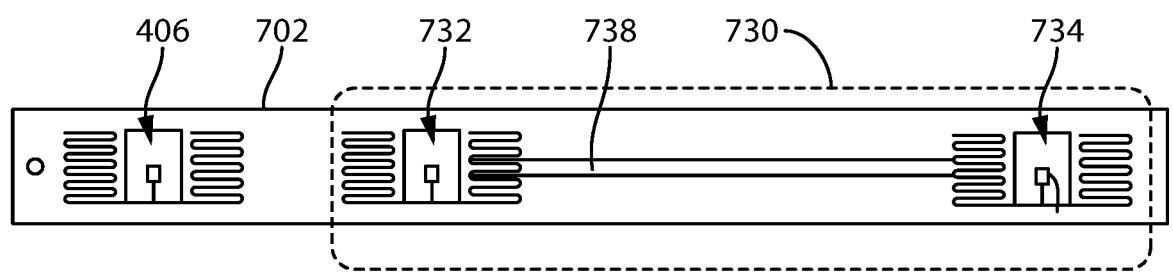
FIG. 7 is a diagram illustrating an application using a multi-tag RFID device in accordance with several embodiments.

In some embodiments, a multi-tag RFID device may be implemented on the first portion (e.g., first component) of a container and useful to indicate one or more open statuses of the container. Referring to FIG. 7, an embodiment of the first component of FIGS. 4A and 4B is shown where a multi-tag RFID device 730 is used to implement second and third RFID tags (e.g., second and third RFID tags 312 and 314). For example, the first component 702 includes the first RFID tag 406 and a multi-tag RFID device 730 including a first near field RFID tag device 732 and a second near field RFID tag device 734 that are each coupled to and share a conductive element 738 that functions as a far field antenna to both the first and second near field RFID tag devices 732 and 734. The first near field RFID tag device 732 and the conductive element 738 couple together and function as a second RFID tag (e.g., second RFID tag 312 or 412). The second near field RFID tag device 734 and the conductive element 738 couple together and function as a third RFID tag (e.g., third RFID tag 314). In some embodiments, each of the first and second near field RFID tag devices 732 and 734 include an integrated circuit or chip (e.g., chip 428, 420) and a near field antenna (e.g., loop antenna 422, 430).

When the first component 702 is fully inserted into the second component 404, the first RFID tag 406 couples to the conductive element 408 such that the first RFID tag 406 is readable in the far field. When the first component 402 is moved relative to the second component 404 a first amount (such as in FIG. 3B), the first RFID tag 406 is no longer readable in the far field, and both the first near field RFID tag device 732 and the second near field RFID tag device 734 are likewise not readable in the far field since they are shielded by the second component 404. When the first component 402 is moved relative to the second component 404 a second amount (such as in FIG. 3C), the first near field RFID tag device 732 is exposed making it readable in the far field whereas the second near field RFID tag device 734 is not readable in the far field since it is still shielded by the second component 404. When the first component 402 is moved relative to the second component 404 a third amount (such as in FIG. 3C), both the first near field RFID tag device 732 and the second near field RFID tag device 734 are exposed, making them both readable in the far field.

Figure 8:
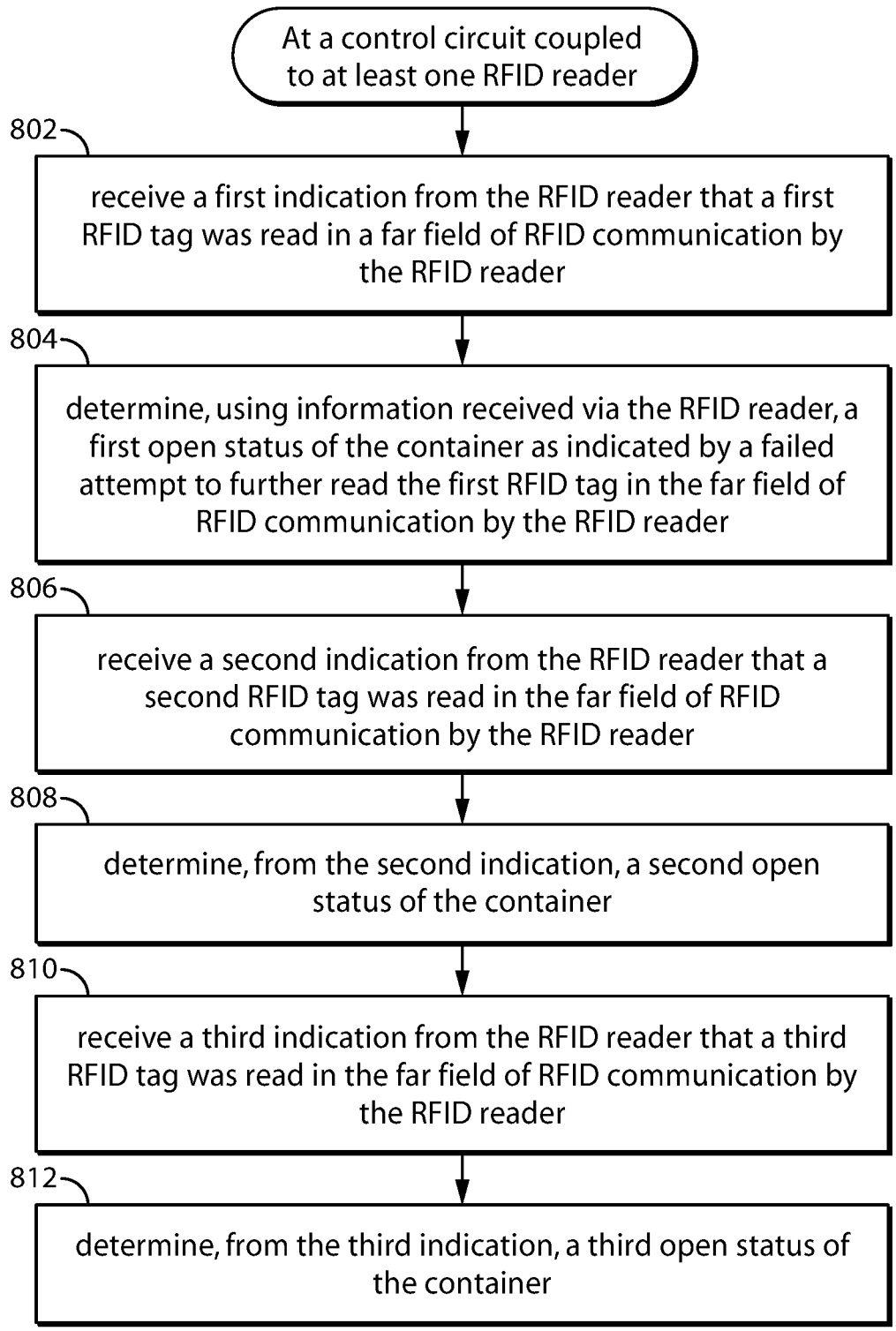
FIG. 8 is a flow diagram of a method in accordance with several embodiments.

Reference is now made to the flow diagram of FIG. 8 which illustrates a process occurring at a control circuit (e.g., control circuits 104 and/or 200) coupled to at least one RFID reader in accordance with several embodiments. The process of FIG. 8 may be performed by one or more of the systems and applications described herein.

Generally, the control circuit uses (or is configured to use) at least information received via the RFID reader regarding a reading of one or more RFID tags by the RFID reader, to determine one or more open statuses of a container normally in a closed orientation and which can at least be partially opened.

In Step 802, the control circuit receives a first indication from the RFID reader that a first RFID tag was read in a far field of RFID communication by the RFID reader. In some embodiments, the first RFID tag is fixed to a first portion of the container and configured by itself to communicate only in a near field of RFID operation. The first RFID tag is located in proximity to a conductive element implemented at a second portion of the container when the container is in the closed orientation, such that the conductive element is configured to function as a far field antenna for the first RFID tag when the container is in the closed orientation. In this arrangement and configuration, the first RFID tag is readable and is read in the far field of RFID communication (e.g. see the first RFID tag 306 in FIG. 3A). In some embodiments, the reading of the first RFID tag indicates the open status of the container as being fully closed or fully sealed.

Upon a user action to open the container at least a first amount (e.g., see FIG. 3B), the first portion and the second portion of the container move relative to each other decoupling the conductive element from the first RFID tag such that the first RFID tag is no longer readable in the far field. In this case, the first RFID tag can no longer be read in the far field and attempts to read the first RFID tag will result in a failure. In step 804, the control circuit determines, using information received via the RFID reader, a first open status of the container as indicated by a failed attempt to further read the first RFID tag in the far field of RFID communication by the RFID reader. In some embodiments, the first open status comprises at least one of an unsealed status and an opening motion initiation status.

The container also includes a second RFID tag that is fixed to the first portion of the container such that the second RFID tag is shielded by the second portion and is not readable by the RFID reader when the container is in the closed orientation. Next, upon a user action to open the container at least a second amount (e.g., see FIG. 3C), the first portion and the second portion move relative to each other such that the second RFID tag is no longer shielded and is now readable in the far field by the RFID reader. In this case, the second RFID tag will respond to interrogation signaling from the RFID reader, e.g., providing its identification. The RFID reader will now be able to read the second RFID tag in the far field. In step 806, the control circuit receives a second indication from the RFID reader that a second RFID tag was read in the far field of RFID communication by the RFID reader. In step 808, the control circuit determines, from the second indication, a second open status of the container. Depending on the embodiment, the second open status comprises one or more of an unsealing confirmation, an open motion initiation status, an open motion confirmation, a partial open status and a fully open status.

The container also includes a third RFID tag that is fixed to the first portion such that the third RFID tag is shielded by the second portion and is not readable by the RFID reader when the container is in the closed orientation. Upon a user action to open the container at least a third amount (e.g., see FIG. 3D), the first portion and the second portion move relative to each other such that the third RFID tag is no longer shielded and is now readable by the RFID reader. In this case, the third RFID tag will respond to interrogation signaling from the RFID reader, e.g., providing its identification. The RFID reader will now be able to read the third RFID tag in the far field. In step 810, the control circuit receives a third indication from the RFID reader that a third RFID tag was read in the far field of RFID communication by the RFID reader. In step 812, the control circuit determines, from the third indication, a third open status of the container. In some embodiments, the third open status comprises a fully open status.

Figure 9A:
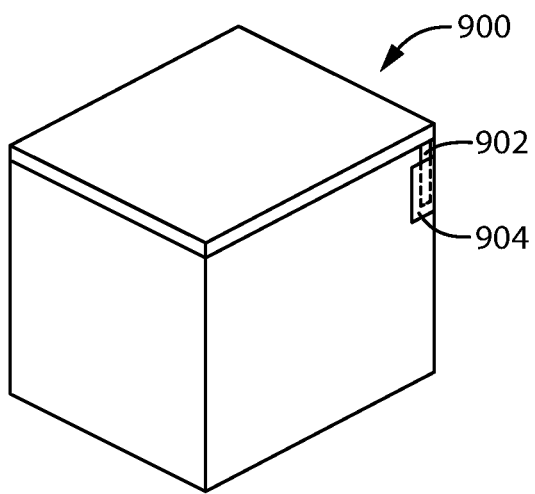
FIGS. 9A-9C are illustrations of a container in accordance with several embodiments.
Figure 9B:
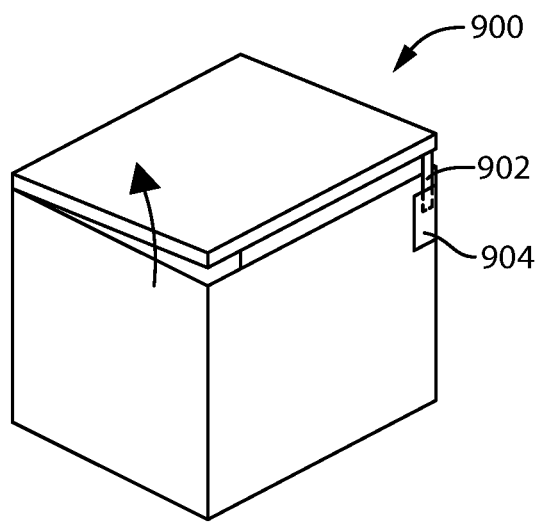
Figure 9C:
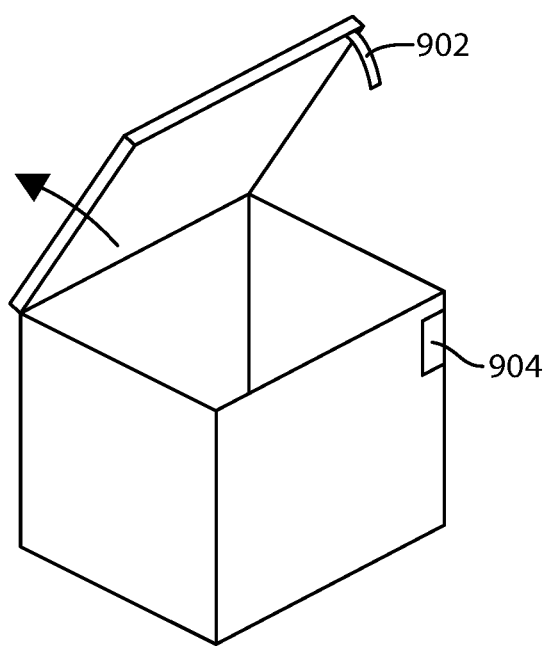

Referring next to FIGS. 9A-9C, illustrations are shown of a generic container 900 normally in a closed orientation (see FIG. 9A) and which will be at least partially opened through user actions (see FIGS. 9B and 9C). In these embodiments, the container 900 includes a first portion 902 and a second portion 904 that are removably coupled to each other. For example, in the illustrated embodiment, the first portion 902 is a first component (e.g., the first component 302, 402 or 702) coupled to a lid of the container and the second portion 904 is a second component (e.g., the second component 302 or 402) coupled to a body of the container. In FIG. 9A, a first RFID tag (e.g., first RFID tag 306) is readable in the far field since it is coupled a conductive element (e.g., element 308) of the second portion, but the second and optional third RFID tags (e.g., RFID tags 312 and 314) are shielded by the second portion and are not readable in the far field. In some embodiments, given that only the first RFID tag is readable in the far field, this indicates that the open status of the container is fully closed and/or fully sealed.

In FIG. 9B, the first and second portions 902 and 904 have been moved an amount relative to each other, which decouples the first RFID tag from the conductive element such that the first RFID tag is not readable in the far field. Depending on how far the first and second portions 902 and 904 are moved relative to each other, the second RFID tag (e.g., RFID tag 312) may or may not be readable in the far field. That is, the amount of movement will indicate whether the example diagram of FIG. 3B or 3C is applicable. In FIG. 9B, the optional third RFID tag is shielded by the second portion 904. In some embodiments, if the first RFID tag is no longer readable in the far field, this indicates an open status of one or more of an unsealed status and an opening motion initiation status. In some embodiments, if the second RFID tag is also readable, this can indicate an open status of one or more of an unsealing confirmation, an open motion confirmation, a partial open status and a fully open status. In the illustrated embodiment, the open status is all of an unsealing confirmation, an open motion confirmation, and a partial open status.

In FIG. 9C, the first and second portions 902 and 904 have been moved a further amount relative to each other such that one or both of the second and third RFID tags are now readable in the far field, e.g., such as in the illustration of FIG. 3D. In some embodiments, if the second RFID tag and optional third RFID tag are also readable, this indicates an open status of one or more of an unsealing confirmation, an open motion confirmation, a partial open status and a fully open status. In the illustrated form, the open status is fully open.

Figure 10A:
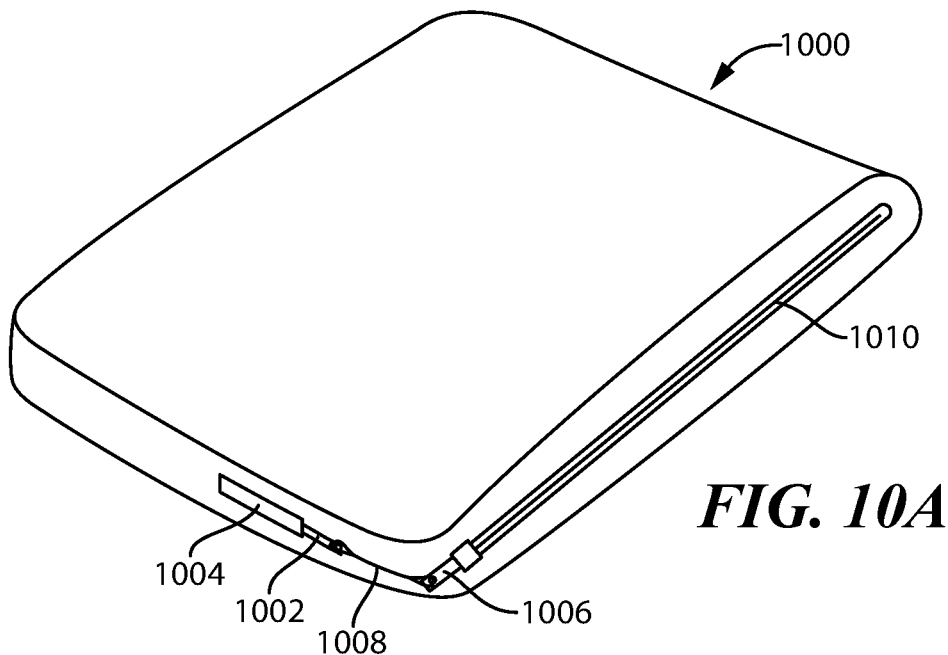
FIGS. 10A-10C are illustrations of another container in accordance with several embodiments.
Figure 10B:
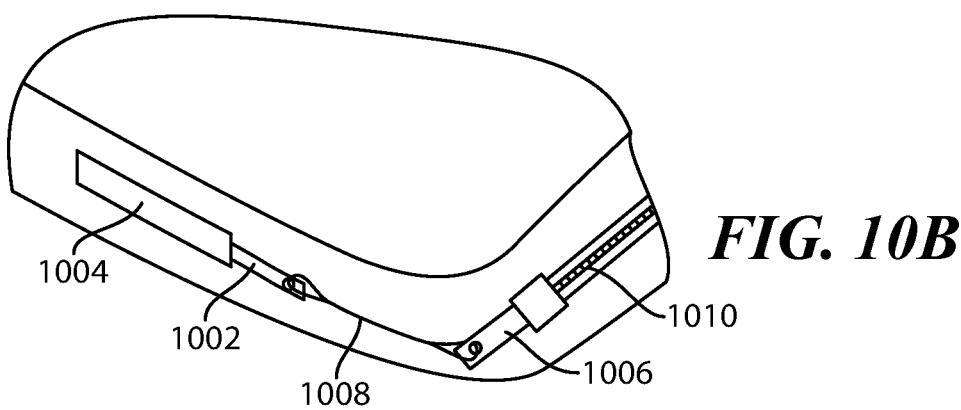
Figure 10C:
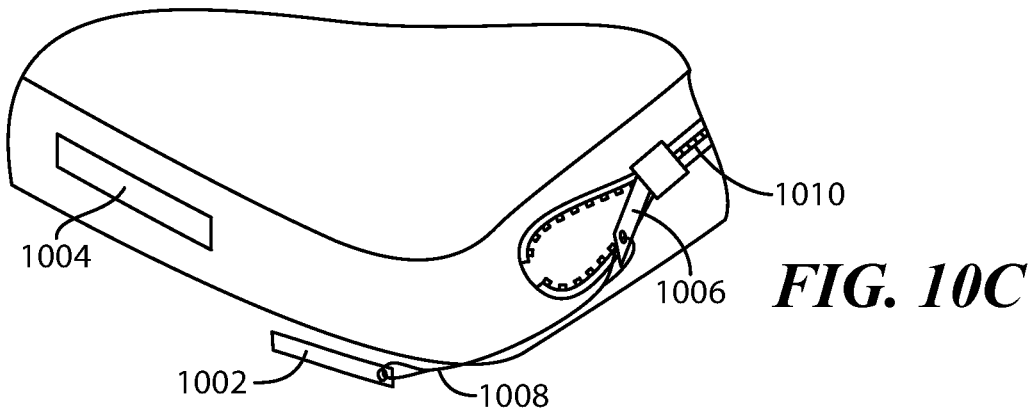

While the container illustrated in FIGS. 9A-9C takes the form of a box-like container, it is understood that the containers described herein may be implemented any type of known container or any shape, size, material weight, enclosure mechanism known the art. In this regard, FIGS. 10A-10C illustrate another container 1000 taking the form of a zippered bag or pouch. FIG. 10A and the enlargement of FIG. 10B illustrate the container 1000 in the closed orientation where a first portion 1002 is inserted within a second portion 1004 coupled to an exterior portion of the container 1000. The first portion 1002 is coupled by a connector 1008 (string or wire) to a zipper pull 1006 of a zipper 1010. As illustrated in FIG. 10C, when the user pulls the zipper pull 1006 to open the container 1000, the first portion 1002 is removed at least some amount from the second portion 1004. In FIG. 10C, the first portion 1002 is fully removed from the second portion 1004. The degree of removal of the first portion 1002 from the second portion 1004 and the cessation of reading and the readability of certain RFID tags will indicate various open statuses of the container, which are automatically determined by a control circuit coupled to an RFID reader. The first and second portions 1002 and 1004 can be in accordance with any such portions or components described and taught herein.

Figure 11:
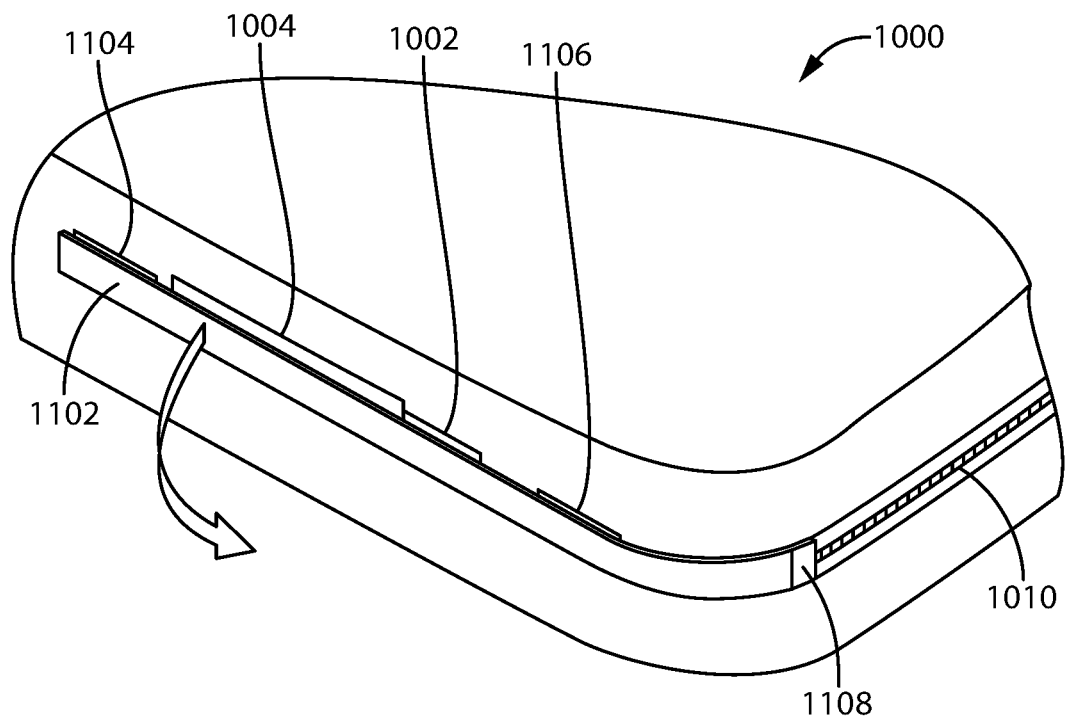
FIG. 11 is a variation of the container of FIGS. 10A-10C in accordance with several embodiments.

In a variation of FIGS. 10A-10C, as shown in FIG. 11, a protective flap 1102 is positioned over the first portion 1002 and the second portion 1004 and is connected to the zipper 1010. The under surface of the protective flap 1102 includes a top Velcro surface (one of hook and loop structured surfaces) mated to bottom Velcro surfaces 1104 and 1106 (the other of hook and loop structured surfaces) in order to hold the flap 1102 in position over the first and second portions. To open the container, the flap 1102 is peeled back and pulled. In this embodiment, the flap is coupled to the first portion 1002 and to the zipper 1010 at the pull location 1108; thus, the flap becomes the zipper pull. When the flap 1102 is pulled back (even before the zipper is opened), the first portion 1002 is at least partially removed from the second portion 1004.

Figure 13A:
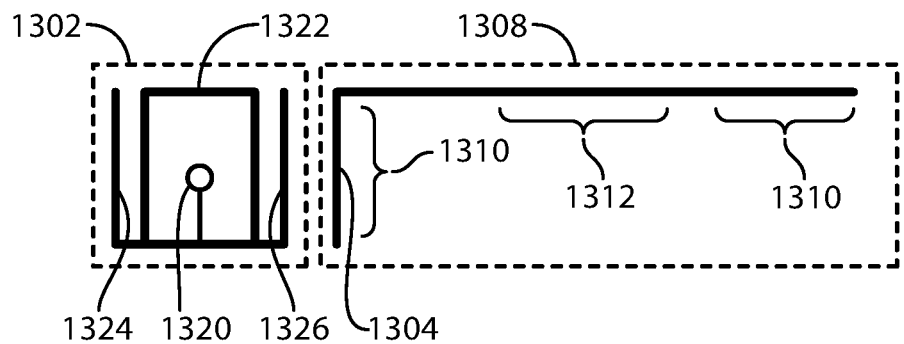
FIGS. 13A-13B are diagrams illustrating the coupling and decoupling of near field and far field components in accordance with some embodiments.
Figure 13B:
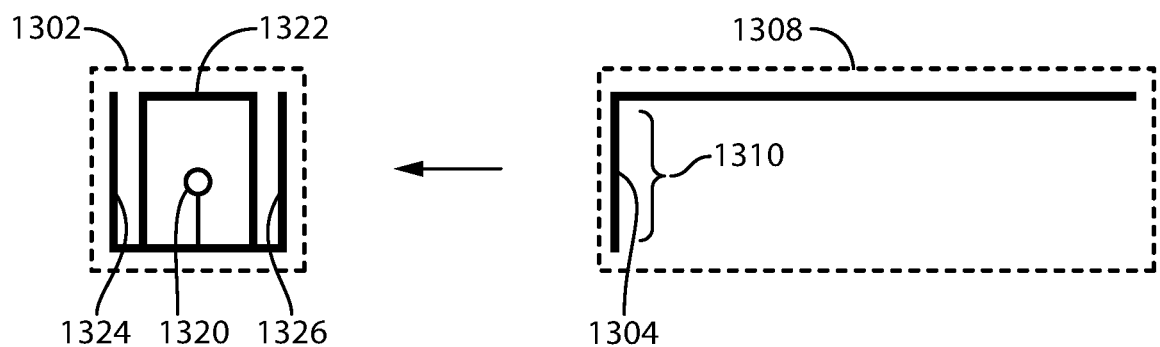

To further illustrate the coupling and decoupling of near field and far field components of an RFID device in accordance with some embodiment, reference is made to FIGS. 13A-13B. In FIG. 13A, a near field RFID tag 1302 is illustrated including an integrated circuit or chip 1320 coupled to a near field antenna 1322 (e.g., loop antenna) and including elongated conductors 1324 and 1326 that allow the near field antenna 1322 to be coupled to a conductive element 1308 that functions as a far field antenna. In FIG. 13A, the conductor 1326 is capacitively coupled to the conductive element 1308.

In operation, each of the conductors 1324 and 1326 can function as a first electrode of a capacitor formed between itself and a far field or tag antenna, where a portion of the far field antenna forms the second electrode of the capacitor. Electromagnetic energy from the tag reader causes the voltage on the far field antenna (particularly at its end) to oscillate building a charge. This creates an oscillating potential difference at each elongated side of the near field RFID tag 1302, which causes a current to flow about the loop 1322. This flowing current allows the chip 1320 to operate and in turn, the conductive element 1308 functioning as the far field antenna capacitively coupled to the RFID tag 1302 to transmit an encoded backscattered signal to the tag reader.

In one embodiment, the near field RFID tag 1302 may be pre-manufactured. According to several embodiments, the near field RFID tag 1302 does not function as a far field RFID tag, i.e., on its own, it cannot be read in the far field by a reader. In preferred embodiments, the near field antenna 1322 is designed, shaped and/or configured to be suitable for use with a far field antenna capacitively coupled thereto. In some cases, the width or thickness of the conductors 1324 and 1326 is designed to ensure good capacitive coupling with the far field antenna.

The conductors 1324 and 1326 may extend from the near field antenna 1322 in a variety of ways and have varying lengths depending on the far field antenna it is intended to couple with. However, the coupling conductors 1324 and 1326 do not themselves function as far field antennas. Accordingly, while there is some additional conductive material apart from the near field antenna 1322, the near field RFID tag 1302 apart from a far field antenna is a near field only RFID tag that functions in the near field. For example, the conductors 1324 and 1326 cause the near field RFID tag 1302 to operate in the near field radiating sub-region 1204, whereas the near field antenna 1322 (e.g., loop) causes the near field RFID tag 1302 to operate in the near field reactive sub-region 1206.

When coupled with a far field antenna such as conductive element 1308, the resulting combination functions in both the near field and the far field. In some embodiments, to affect capacitive coupling, the near field RFID tag 1302 is coupled in a spaced relationship to one end 1304 of the conductive element 1308 (e.g., at a distal region 1310 of the conductive element as opposed to at or near the central region 1312). In operation, the voltage at the end 1304 (distal region 1310) oscillates due to the received electromagnetic energy from the reader. In some embodiments, the end 1304 and the conductor 1326 form two electrodes of a capacitor. As the voltage oscillates at the end 1304 building a charge, this creates an oscillating potential difference at the side of the tag 1302, which causes a current to flow about the near field antenna 1322. This flowing current allows the chip 1320 to operate and in turn, the conductive element 1308 capacitively coupled to the tag 1302 to transmit an encoded backscattered signal to the tag reader. When the end 1304 or distal region 1310 of the conductive element 1308 is capacitively coupled to the near field RFID tag 1302, the device becomes visible in the far field to an RFID reader.

As illustrated in FIG. 13B, when the near field RFID tag 1302 and the conductive element 1308 are moved relative to each other, the two components are decoupled, i.e., no longer capacitively coupled. Thus, the near field RFID tag 1302 is now only readable in the near field, not in the far field.

The near field RFID tag 1302 could be an embodiment of the first RFID tag 302 or 406, for example, and the conductive element may be an embodiment of conductive elements 308 and 408, for example. It is understood that while FIGS. 13A-13B illustrate the capacitive coupling of the near field RFID tag 1302 and the conductive element 1308, in other embodiments, the two components may be inductively or electrically coupled together such as described in the various patent documents incorporated herein by reference.

In some embodiments, an application of one or more embodiments of the methods and structures to determine an open status of a container may be used in a secure delivery application in order to determine and/or verify opening of a package intended for delivery to a recipient (person). For example, the container may be delivered and locked within a delivered-package vault such as described in U.S. patent application Ser. No. 14/052,102 filed Oct. 11, 2013 and entitled SECURE DELIVERY RECEPTACLE, which is incorporated herein by reference. In some embodiments, the container contains the package for delivery to an intended recipient. The container is stored in the delivered package vault and locked therein, such that the intended recipient is not required to be physically present to accept delivery of the package. Such package vault may contain one or more structures and methods to determine that the container with package has been placed within the vault. In some embodiments, the container is pre-located in the vault (or part of the vault) and the package is delivered to the vault and inserted into the container within the vault by the delivery person. In some embodiments, the vault includes an RFID reader configured to read tags in the far field of RFID operation. When an intended recipient accesses the package vault to retrieve the package from the container (e.g., at the recipients convenience), one or more methods and/or apparatuses described herein may be used to determine the open status of the container. For example, the container includes a first RFID tag and the second RFID tag (and optional third or additional RFID tag/s) as variously described herein. If the first RFID tag is read by the vault's reader, the control circuit (coupled to the reader) can determine that the container is sealed/closed. However, once the first tag is no longer read by the reader, the control circuit can determine that the container is unsealed or that the container opening has been initiated or confirmed, for example. In some forms, the vault can distinguish a scenario where the first tag is not being read anymore because the container was moved from the vault out of range of the reader without opening the container (e.g., the container is fixed into the vault, opening size restriction, or there is another way (e.g., visual) to verify that the container is present in the vault). Once the second and optional third or more RFID tags are read by the reader (as they are exposed as described herein), the control circuit can determine one or more additional open status. Once the recipient has opened the container, the package may be retrieved therefrom, completing delivery. In some embodiments, measures can be taken to ensure that the right container has been opened by the right recipient. For example, by reader the various tags and using their identifiers, the control circuit can determine if the proper user (e.g., as determined at the point of access to the vault) has opened the proper container. If not, warning messages, emails, text messages or other electronic warnings may be issued to the appropriate system or person/s. In some embodiments, the container may be a refrigerated container or otherwise a container that requires sealing due to the package contained therein. Thus, in some embodiments, the reading or cessation of reading of the RFID tags can be used to determine an unsealed status. In the case of perishable packages (e.g., groceries, food items, refrigerated items, etc.), the control circuit (or other circuit or system in communication therewith) could start a timer and track whether the container has been fully opened within a specified time. For example, one could accidentally unseal a container but not open it fully, which would be detectable. In another example, someone may gain access to the vault and tamper with one or more containers, which could be detected in the opening/unsealing of the container. In some embodiments, since the first portion is flexible insert within a sleeve (second portion) and may even require an insertion tool, it would be difficult for one who tampered or accidentally unsealed a package to re-insert the first portion into the second portion. Corrective action could be taken or signaled to be taken, e.g., a warning message, refund of purchase, re-delivery of the item, etc. There are many alternatives and variations of these example applications that may use one or more embodiments of the methods and apparatuses described herein. It is understood that many other applications may use one or more embodiments of the methods and apparatuses described herein.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A device to indicate an open status of a container containing one or more items for delivery, the device comprising:
    a first portion of a container;
    a second portion of the container coupled to the first portion, wherein the second portion comprises a conductive material; and
    an RFID tag device comprising:
        a substrate;
        a first RFID tag fixed at a first portion of the substrate; and
        a second RFID tag fixed at a second portion of the substrate;
        wherein the second portion of the substrate is positioned against the second portion of the container such that the second RFID tag is shielded by the conductive material and cannot emit signals to be received by a receiver circuit proximate the container, and wherein the first portion of the substrate is not positioned against the second portion of the container such that the first RFID tag can emit signals to be received by the receiver circuit proximate the container;
wherein, upon a user action that causes a movement of the first portion of the container and the second portion of the container relative to each other such that, the second RFID tag is no longer shielded by the conductive material and can emit signals to be received by the receiver circuit proximate the container indicating an open status of the container.

2. The device of claim 1, wherein the open status comprises at least one of an unsealed status, an indication that the RFID tag device is separated from the second portion of the container, and an opening motion initiation status.

3. The device of claim 1, wherein the open status comprises at least one of an unsealing confirmation, an open motion confirmation, a partial open status, an indication that the RFID tag device is separated from the second portion of the container, and a fully open status.

4. The device of claim 1, wherein the second RFID tag comprises a near field RFID tag and a far field antenna fixed to the substrate, wherein the far field antenna is configured to allow the near field RFID tag to be readable in a far field of RFID communication by the receiver circuit, wherein upon the user action that causes the movement of the second portion of the substrate from the second portion of the container, the second RFID tag is no longer shielded by the conductive material and is readable by the receiver circuit indicating the open status of the container.

5. The device of claim 1, further comprising a third RFID tag fixed to a third portion of the substrate, wherein the third portion of the substrate is positioned against the second portion of the container such that the third RFID tag is shielded by the conductive material and is not readable by the receiver circuit;
wherein upon a user action that causes a movement of the third portion of the substrate and the second portion of the container relative to each other, the third RFID tag is no longer shielded by the conductive material and is readable by the receiver circuit indicating another status of the container.

6. The device of claim 1, wherein the conductive material of the second portion of the container comprises a component fixed to the container.

7. The device of claim 6, wherein the component comprises a strip conductive material having length and width dimensions substantially corresponding to length and width dimensions of the second portion of the substrate of the RFID tag device.

8. The device of claim 1, wherein the conductive material is configured to function as a Faraday cage to shield the second RFID tag when the second portion of the substrate is positioned against the second portion of the item.

9. The device of claim 1, wherein the open status comprises an indication that the RFID tag device is separated from the second portion of the container.

10. The device of claim 1,
wherein the first RFID tag comprises a first near field RFID tag device;
wherein the second RFID tag comprises a second near field RFID tag device;
wherein the substrate further comprises a conductive element fixed to the substrate and having a first portion proximate and coupled to the first near field RFID tag device and having a second portion proximate and coupled to the second near field RFID tag device,
wherein the conductive element is configured to function as a far field antenna and is shared by the first near field RFID tag device and the second near field RFID tag device and configured to allow the first near field RFID tag device to be readable in a far field of RFID communication by the receiver circuit, and configured to allow the second near field RFID tag device to be readable in the far field of RFID communication by the receiver circuit upon the user action that causes the movement of the second portion of the substrate from the second portion of the container, the second near field RFID tag device being no longer shielded;
wherein the first near field RFID tag device and the second near field RFID tag device are coupled to the conductive element through one of electrical, inductive and capacitive coupling;
wherein the substrate, the first near field RFID tag device, the second near field RFID tag device and the conductive element are integrated as at least a portion of a single inlay; and
wherein the first near field RFID tag device and the second near field RFID tag device each comprise a near field only RFID tag comprising an RFID chip and a near field antenna.

11. A method comprising:
by a control circuit that is operably coupled to a receiver circuit proximate a container comprising one or more items for delivery, wherein the container comprises a first portion and a second portion coupled to the first portion, and wherein the second portion comprises a conductive material:
receiving a first indication from the receiver circuit proximate the container that a first RFID tag was read by the receiver circuit, wherein the first RFID tag is part of an RFID tag device comprising a substrate, the first RFID tag and a second RFID tag, wherein the first RFID tag is fixed at a first portion of the substrate, wherein the second RFID tag is fixed at a second portion of the substrate, wherein the second portion of the substrate is positioned against the second portion of the container, wherein the second RFID tag is shielded by the conductive material and cannot emit signals to be received by the receiver circuit proximate the container, and wherein the first portion of the substrate is not positioned against the second portion of the container such that the first RFID tag can emit signals to be received by the receiver circuit proximate the container allowing the first indication to be received by the receiver circuit;
receiving, upon a user action that causes a movement of the first portion of the container and the second portion of the container relative to each other such that the second RFID tag is no longer shielded by the conductive material and can emit signals to be received by the receiver circuit proximate the container, a second indication from the receiver circuit that the second RFID tag was read by the receiver circuit; and
determining, from the second indication, an open status of the container.

12. The method of claim 11, wherein the open status comprises at least one of an unsealed status, an indication that the RFID tag device is separated from the second portion of the item, and an opening motion initiation status.

13. The method of claim 11, wherein the open status comprises at least one of an unsealing confirmation, an open motion confirmation, a partial open status, an indication that the RFID tag device is separated from the second portion of the item, and a fully open status.

14. The method of claim 11, wherein the second RFID tag comprises a near field RFID tag and a far field antenna fixed to the substrate, wherein the far field antenna is configured to allow the near field RFID tag to be readable in a far field of RFID communication by the receiver circuit proximate the container, and wherein the receiving the second indication comprises receiving, upon the user action that causes the movement, the second indication from the receiver circuit that the second RFID tag was read by the receiver circuit.

15. The method of claim 11, wherein a third RFID tag is fixed to a third portion of the substrate, wherein the third portion of the substrate is positioned against the second portion of the container such that the third RFID tag is shielded by the conductive material and is not readable by the receiver circuit,
the method further comprising:
by the control circuit:
receiving, upon a user action that causes a movement of the third portion of the substrate and the second portion of the container relative to each other such that the third RFID tag is no longer shielded by the conductive material, a third indication from the receiver circuit that the third RFID tag was read by the receiver circuit; and
determining, from the third indication, another status of the container.

16. The method of claim 11, wherein the conductive material of the second portion of the container comprises a component fixed to the container.

17. The method of claim 16, wherein the component comprises a strip conductive material having length and width dimensions substantially corresponding to length and width dimensions of the second portion of the substrate of the RFID tag device.

18. The method of claim 11, wherein the conductive material is configured to function as a Faraday cage to shield the second RFID tag when the second portion of the substrate is positioned against the second portion of the container.

19. The method of claim 11, wherein the open status comprises an indication that the RFID tag device is separated from the second portion of the container.

20. The method of claim 11,
wherein the first RFID tag comprises a first near field RFID tag device;
wherein the second RFID tag comprises a second near field RFID tag device;
wherein the substrate further comprises a conductive element fixed to the substrate and having a first portion proximate and coupled to the first near field RFID tag device and having a second portion proximate and coupled to the second near field RFID tag device,
wherein the conductive element is configured to function as a far field antenna and is shared by the first near field RFID tag device and the second near field RFID tag device and configured to allow the first near field RFID tag device to be readable in a far field of RFID communication by the receiver circuit, and configured to allow the second near field RFID tag device to be readable in the far field of RFID communication by the receiver circuit upon the user action that causes the movement of the second portion of the substrate from the second portion of the container, the second near field RFID tag device being no longer shielded;
wherein the first near field RFID tag device and the second near field RFID tag device are coupled to the conductive element through one of electrical, inductive and capacitive coupling;
wherein the substrate, the first near field RFID tag device, the second near field RFID tag device and the conductive element are integrated as at least a portion of a single inlay; and
wherein the first near field RFID tag device and the second near field RFID tag device each comprise a near field only RFID tag comprising an RFID chip and a near field antenna.

* * * * *